United States Patent [19]
Bauer et al.

[11] Patent Number: 5,375,876
[45] Date of Patent: Dec. 27, 1994

[54] AIR BAG DEPLOYMENT DOOR INSTALLATION

[75] Inventors: David J. Bauer, West Bloomfield; Anthony J. DiSalvo, Allen Park, both of Mich.

[73] Assignee: Tip Engineering Group, Inc., Farmington Hills, Mich.

[21] Appl. No.: 132,448

[22] Filed: Oct. 5, 1993

[51] Int. Cl.⁵ .............................................. B60R 21/16
[52] U.S. Cl. ................................ 280/728 B; 280/732
[58] Field of Search ............... 280/728 A, 728 B, 731, 280/732, 743 R

[56] References Cited

U.S. PATENT DOCUMENTS 5,125,683 6/1992 Nakajima ..................... 280/728 B

FOREIGN PATENT DOCUMENTS 488618 6/1992 European Pat. Off. ........ 280/728 B
56654 2/1992 Japan ............................ 280/728 A

*Primary Examiner*—Kenneth R. Rice
*Attorney, Agent, or Firm*—John R. Benefiel

[57] ABSTRACT

A construction for an invisible seam air bag deployment door installation in which foam layer wells extend along the hinging side of each door panel to freely allow hinging movement of the door panels by ready compression of the foam in the foam wells, preventing outward extension of the doors during opening underlow temperature conditions. The compression of the foam in the wells also prevents fragmentation of the skin and foam.

7 Claims, 3 Drawing Sheets

PENETRATION AREA

AIR BAG DEPLOYMENT DOOR INSTALLATION

BACKGROUND OF THE INVENTION

This invention concerns air bag safety systems and more particularly a deployment door installation for forming an air bag deployment opening through an interior trim piece at the time of initiation of activation of the air bag system to allow the air bag to be deployed within the passenger compartment as it is inflated.

Air bags are normally stored in a folded condition in a receptacle or canister mounted behind a section of the interior trim, i.e, typically behind the instrument panel for a passenger side front seat air bag installation. A steering wheel cover is often employed as the interior trim piece behind which the air bag is stored.

The deployment opening has commonly been provided by one or more deployment door panels fit into an opening within the interior trim. The deployment doors are hinged along one side and to swing open by pressure exerted by inflation of the air bag. See U.S. Pat. No. 4,893,833 issued on Jan. 16, 1990, for a "Closure for an Air Bag Deployment Opening" and U.S. Pat. No. 4,989,896 issued on Feb. 5, 1991, for a "Double Door Closure for an Air Bag Deployment Opening" for examples of such deployment door installations.

In these designs, the deployment doors are formed of a separate panel from the interior trim piece in which the door is fit and thus is readily visible to an occupant of the vehicle.

There has been heretofore proposed various designs for a so called "invisible seam" deployment door installation in which the outline of the deployment door or door is not visibly delineated in any way to the vehicle occupant, so as to not encourage tampering also to lessen any apprehension created by the conspicuous presence of the air bag.

See for examples, U.S. Pat. No. 5,080,393 issued on Jan. 14, 1992, for a "Method and Apparatus for Forming an Air Bag Deployment Opening"; U.S. Pat No. 5,217,244 issued on Jun. 8, 1993, for "Arrangement for Forming an Air Bag Deployment Opening"; U.S. Pat. No. 5,082,310 issued on Jan. 21, 1992, illustrates both an invisible seam and conventional deployment door design in respective embodiments shown therein.

In such invisible seam deployment door installations, the general arrangement heretofore proposed has included a trim piece substrate having an opening formed therein, with a one or more deployment door substrate panels fit within the trim piece substrate opening, each door panel hinged along one side. Both the trim and door panel substrates are overlain by a layer of molded foam such as polyurethane foam material which in turn is overlain by a decorative covering layer of a durable material such as vinyl.

The covering layer extends in a smooth uninterrupted expanse over both the portions of the adjacent trim piece substrate and one or more deployment door substrate panels such as to not suggest the presence of the deployment door lying beneath the decorative covering layer.

However, in this design, the deployment door panels, when hinged open, force the foam layer over the door substrate panel into the foam layer over the trim substrate located immediately adjacent the hinging side of the deployment door. Particularly at extremely low temperature ambient conditions, it has been discovered that the deployment door will extend itself upon hinging open, such as to strike the inside of the windshield for those deployment door designs in which the hinging access is located close to the inside of the windshield and the deployment door when opened swings towards the windshield.

Since the air bag inflates with considerable force, and the deployment doors open with a resultant high angular velocity, shattering of the windshield and scattering of glass shards into the passenger compartment is a potential hazard.

A further effect has been the disintegration of the covering layer and foam material adjacent the hinging side of the deployment door with the result in fragmentation of these materials. This is also potentially a hazard, as possibly causing showering of debris into the passenger compartment due to the high velocities with which the door swings open.

Accordingly, it is an object of the present invention to provide an improved construction for so-called hidden seam air bag deployment doors which involve a foam layer extending over both the deployment door and trim piece substrate.

SUMMARY OF THE INVENTION

The present inventors have discovered that as a result of the tendency for the foam material to become considerably more rigid under low temperature conditions the foam layer material overlying the deployment door adjacent the hinging axis cannot penetrate the foam material overlying the trim piece substrate panel immediately adjacent the hinging axis since that foam material has become much harder and more rigid. This in turn causes the hinge axis of the deployment door to be forced to shift outwardly to the surface of the foam and vinyl skin covering. This shift in turn a causes stretching out of the deployment door hinge and extends the reach of the free side of the deployment door when swinging open to cause impacting of the door panel with the inside of the windshield, creating the potential glass shattering hazard described above.

The rigid condition of the foam layer material immediately adjacent the hinging side of the deployment door also creates a sort of anvil feature, against which the vinyl and foam material are crushed leaving to the disintegration and fragmentation of this material.

According to the concept of the present invention, the aforementioned situation is corrected by configuring the substrate panel with an offset allowing a "well" or region of the foam layer of considerably greater depth such that the foam layer in the overlying the trim piece substrate in the region immediately adjacent and extending along the hinging side of each deployment door is of a much greater depth than the foam layer overlying the deployment door particularly in the region adjacent the hinging side thereof.

The much greater depth of the foam layer in the foam well creates a proportionally greater compressibility of that foam mass such that the foam material overlying the deployment door moves freely into the adjacent foam mass overlying the trim piece substrate layer even at very low ambient temperatures.

The pivot axis remains centered on the hinge and accordingly there is no extension of the deployment door free edge as it swings open. Furthermore, the vinyl and foam surface material can be pushed freely into the adjacent foam well to also avoid the fragmentation and disintegration of the material.

DESCRIPTION OF THE DRAWINGS

FIG. 3A is a force deformation plot showing the relative incompressibility of the foam overlying the instrument panel substrate.

DETAILED DESCRIPTION

In the following detailed description, certain specific terminology will be employed for the sake of clarity and a particular embodiment described in accordance with the requirements of 35 USC 112, but it is to be understood that the same is not intended limiting and should not be so construed inasmuch as the invention is capable of taking many forms and variations within the scope of the appended claims.

Figure 1:
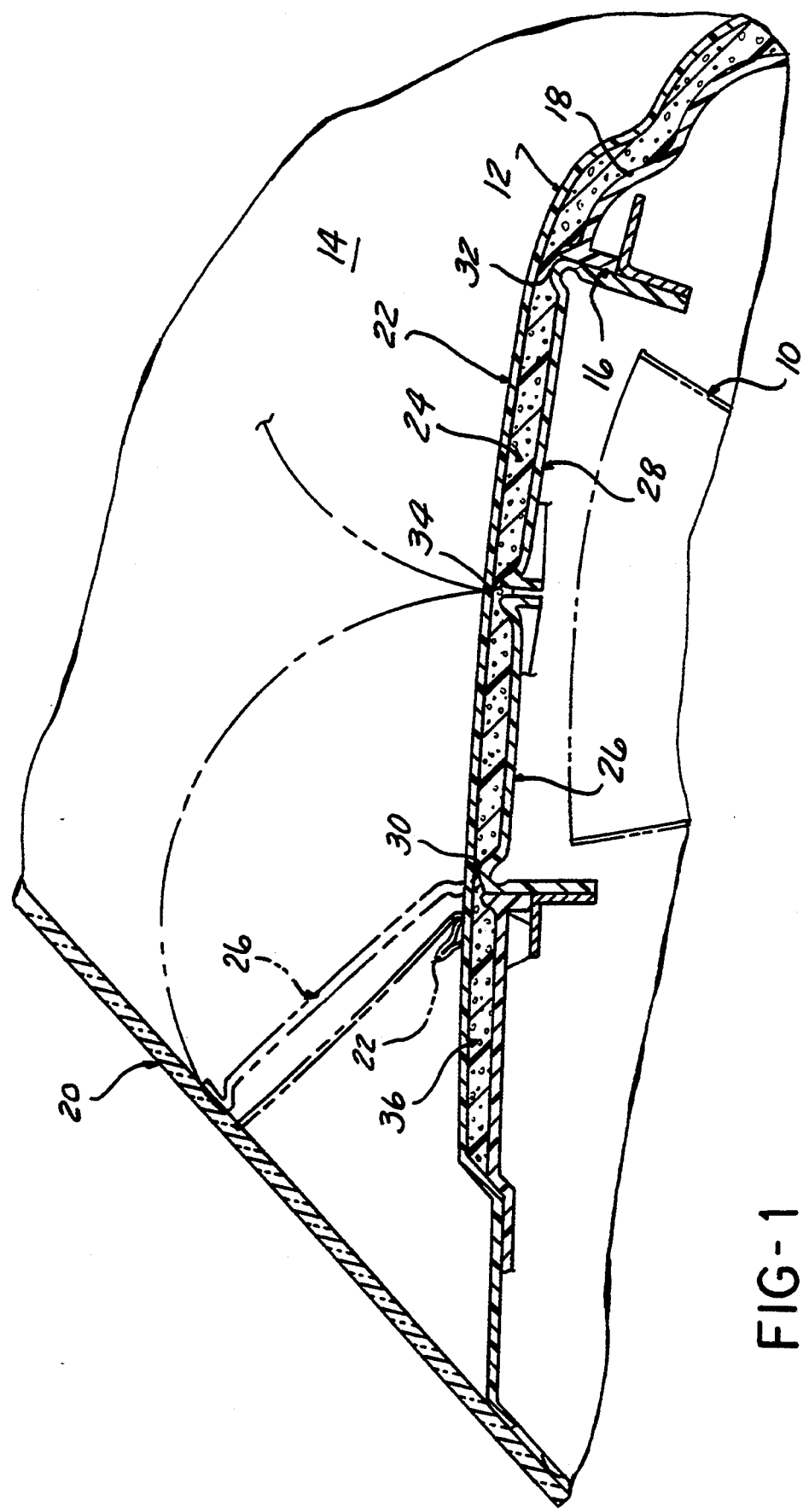
FIG. 1 is a side elevational fragmentary view of an instrument panel and air bag storage canister of a top mounted deployment door installation showing the adjacent windshield according to the prior art design.

Referring to FIG. 1, a typical prior art "invisible seam" air bag deployment door design is illustrated. The particular design shown is a double door, top mounted design in which an air bag storage canister 10 is located beneath the instrument panel 12 mounted within the passenger compartment 14 of a passenger vehicle such as a car or truck.

An opening 16 is formed in a substrate panel 18 of the instrument panel 12. The instrument panel is mounted adjacent the vehicle windshield 20. A smooth expanse of a vinyl covering layer 22 extends over the instrument panel 12, as well as a pair of hinged deployment door substrate panels 26, 28 mounted in the opening 16 within the instrument panel substrate 18.

A layer 24 of a molded foam such as polyurethane fills the space between the vinyl covering layer 22 and the instrument panel substrate 18 and the deployment door substrate panels 26, 28 such as to remove any visual impression which would otherwise be made by the deployment doors.

The deployment door substrate panels 26, 28 are joined at their unhinged opposite sides by a frangible bridging section 34. The substrate panels are typically constructed of a molded, high-strength plastic although aluminum and other materials could be employed.

The deployment door substrates 26, 28 are formed with integral curved hinges 30, 32 attached to the instrument panel substrate 18 as shown.

At low temperatures, the foam layer 24 in the region 36 overlying the instrument panel 18 adjacent the forward deployment door hinge 30 has caused problems when the air bag inflates and pushes open the deployment door substrate panels 26, 28, in that the door substrate panels 26 sometimes, under such low temperature conditions, will extend so as to impact the inside of the windshield 20.

The surface foam material and the vinyl outer layer 22 is forced into the relatively harder foam layer in the region 36, and is crushed and fragmented under in these low temperature conditions.

Figure 2:
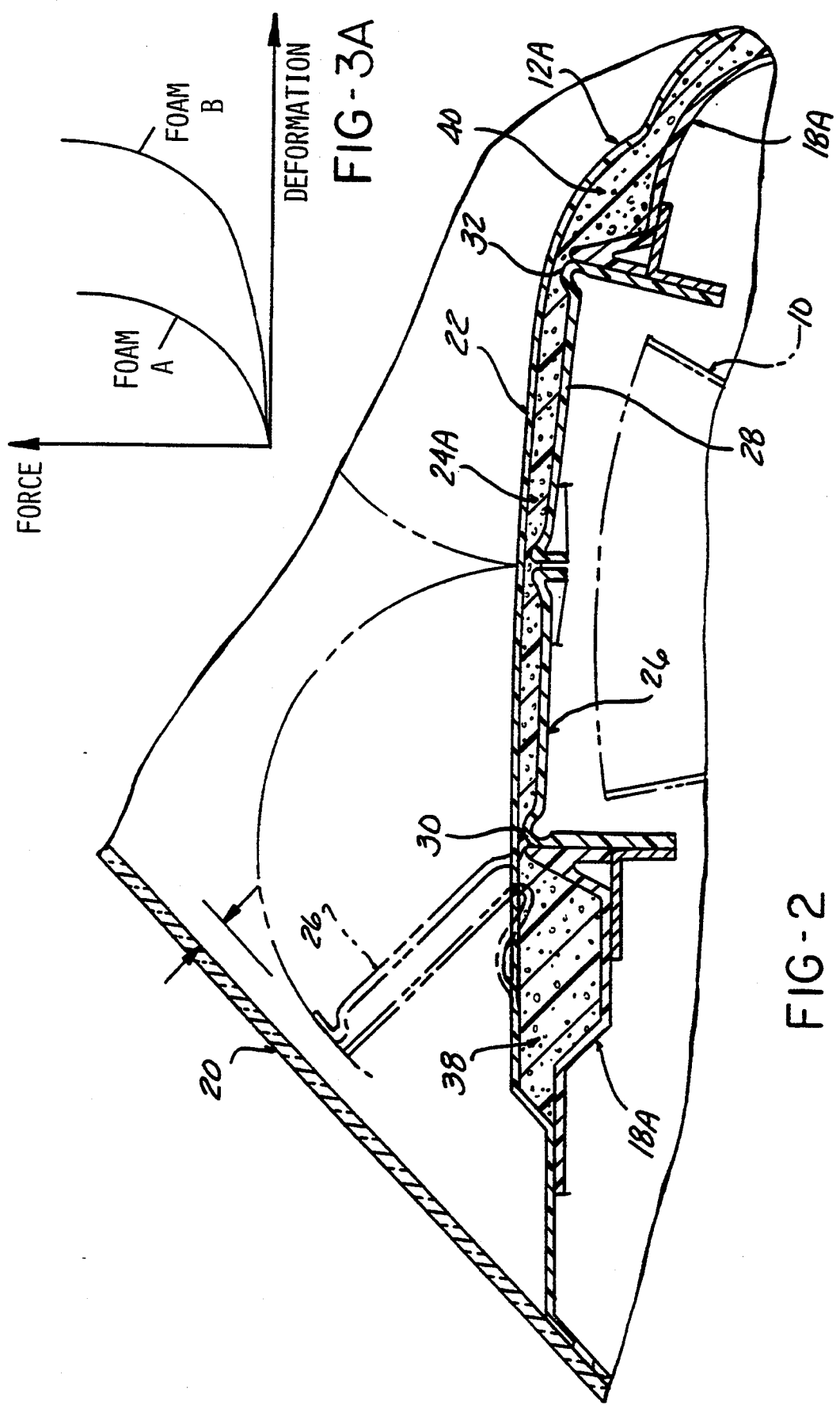
FIG. 2 is a side elevational sectional view through an instrument panel of a passenger compartment having an air bag installed therein together with the fragmentary view of the adjacent windshield showing the improved construction according to the present invention.

Referring to FIG. 2, the construction according the present invention is shown with the same double-door, top mount design. In this construction the instrument panel substrate 18A has a configuration immediately adjacent each hinge 30, 32 which extends downwardly such as to allow for a region of a much greater depth of foam to be disposed therein, i.e., creating foam wells 38, 40 extending alongside each of the hinges 30, 32 on respective deployment door substrate panels 26, 28.

It has been discovered that the much greater depth of foam relative the depth of the foam layer 24A overlying the deployment doors creates a proportionally increased compressibility, such that the foam overlying the instrument panel substrate 18A adjacent the respective hinges 30, 32 allows the covering layer 22 and foam material overlying the deployment door substrate panels 26, 28 adjacent the hinges 30, 32 to easily penetrate into the foam wells 38, 40.

The axis of the hinging of each of the respective deployment door substrate panels 26, 28 remains well below the surface of the vinyl covering layer 22 and is defined by the design axis of the hinges 30, 32.

Accordingly, the forward deployment door substrate panel 26 will sweep within the designed for clearance space between the inside of the windshield 20 as indicated. At the same time, both the skin and foam material adjacent both hinges 30, 32 are able to be moved into the foam wells 38, 40 to prevent crushing and fragmentation thereof.

Figure 3:
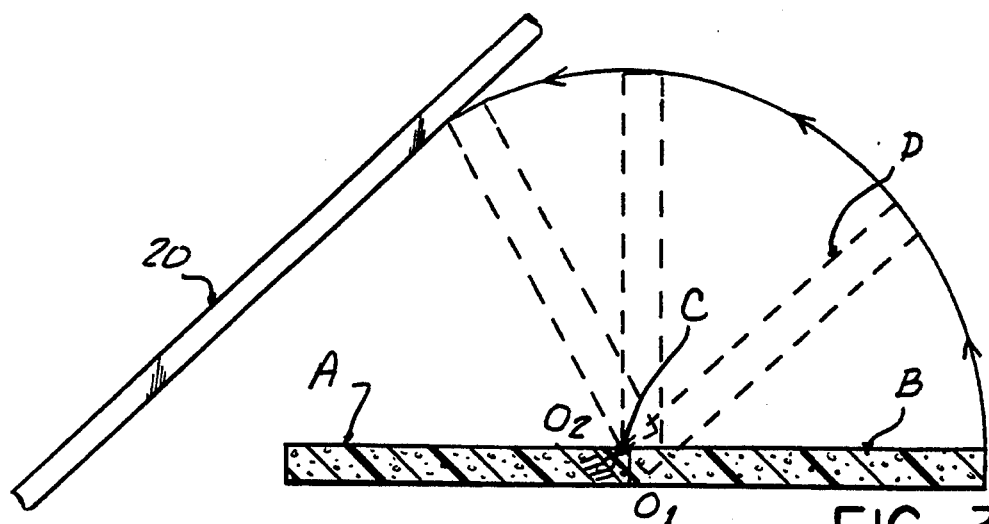
FIG. 3 is a diagrammatic representation of the deployment door and instrument panel foam layers illustrating the effect of lower temperature hardening of the instrument panel foam layer.

Referring to FIG. 3, the diagram of the situation concerning the prior art conventional design of FIG. 1 is shown, in which a foam mass A represents the foam overlying the instrument panel. The foam mass B represents the foam overlying the deployment door substrate panel.

The hinge axis is set by the designed axis of rotation of the hinge of the substrate panel itself. However, if the foam mass A is relatively rigid, the thickness of the foam mass B cannot be rotated into the foam mass A as required when hinging about the pivot axis. This is depicted diagrammatically in FIG. 3A.

Accordingly, a displaced hinge axis lying at the surface of the foam mass will result, extending the sweep of the deployment door D such as to impact the inside of the windshield 20 as indicated.

Figure 4:
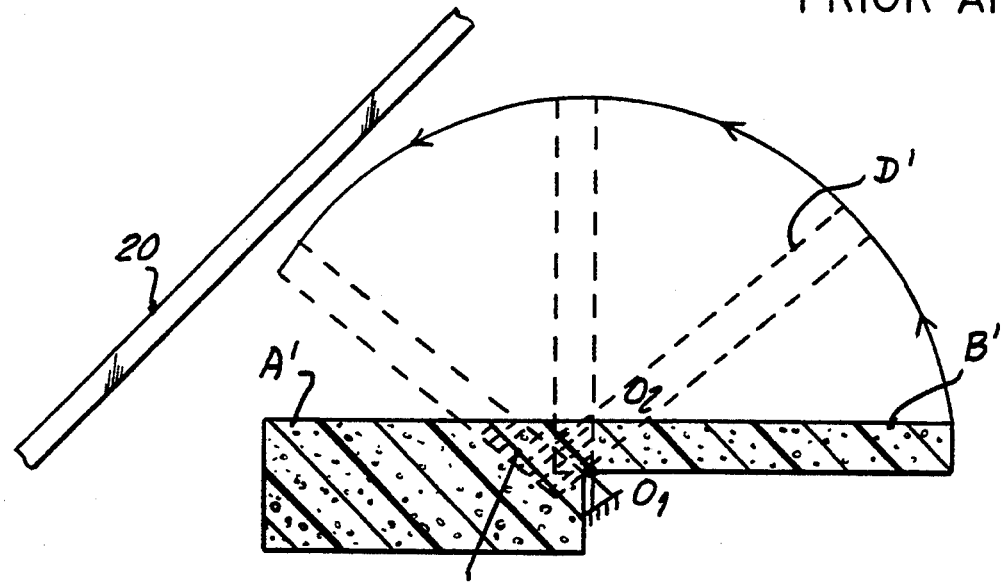
FIG. 4 is a diagrammatic view of the foam components of the deployment door and instrument panel shown in FIG. 2 illustrating the deployment motion utilizing the improved construction of the present invention.

FIG. 4 shows is a diagram showing the arrangement according to the invention, in which the foam mass A' is of a much greater depth than the foam mass B' overlying the deployment door substrate.

Accordingly, the deployment door panel D' will hinge about the design axis, and maintain the clearance inside of the windshield 20.

Figure 5:
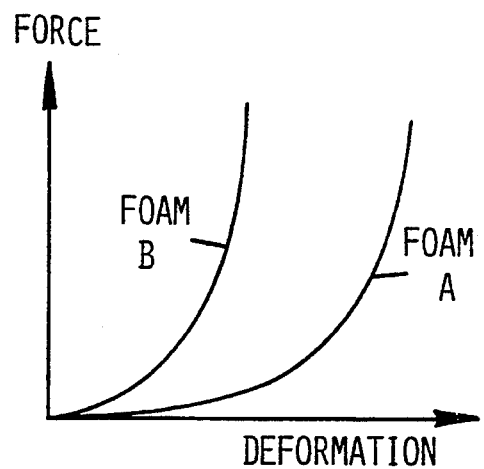
FIG. 5 is a force-deformation plot showing the relative compressibility of the door panel foam layer and the foam well regions adjacent the hinging side of deployment door.

As indicated in FIG. 5, the foam mass A' should be of considerably greater compressibility than the foam mass B in order to produce this result. The depth of the foam mass A' corresponds to the length of a spring with the deformation or elongation of the spring being proportional to its length for a given applied force. The increased depth thus provides a proportionally much greater compressibility.

The compressibility should be a multiple of the foam mass A' overlying the substrate in the region immediately adjacent the hinge side of the deployment door, i.e., should be a minimum of two and preferably three to four times the depth of the foam overlying the deployment door substrate panel in the region immediately adjacent to the hinge axis.

Accordingly, an invisible seam deployment door construction has been provided which will reliably operate without the potential malfunctions over ranges of temperatures in which the foam relatively hardens.

We claim:

1. A construction for an air bag deployment door installation in an instrument panel for a passenger compartment of a passenger vehicle, said instrument panel adjacent a vehicle windshield, said installation comprising an instrument panel substrate member having an opening and one or more deployment door substrate panels fit into said opening at the top of said instrument panel, each of said one or more door substrate panels hinged along a side adjacent said instrument panel substrate to be able to be swung open about a hinging axis to form said air bag deployment opening, one of said door substrate panels swinging toward said windshield, a foam layer covering both said instrument panel and said one or more door substrate panels, and a decorative covering layer overlying said foam layer, a foam well comprised of a region of substantially thicker depth of foam overlying said instrument panel substrate extending along and immediately adjacent said hinging side of said one door substrate panel.

2. The construction according to claim 1 wherein the depth of foam in said foam well is at least twice the depth of the depth of said foam layer over said door substrate panel.

3. The construction according to claim 1 wherein the depth of foam in said foam well is at least four times the depth of said foam layer over said door substrate panel.

4. The construction according to claim 1 wherein said one or more substrate door panels are hinged by means of a curved segment of said substrate door panel extending along said hinged side and turned inwardly and attached to said instrument panel substrate along said deployment opening.

5. The construction according to claim 1 wherein one deployment door substrate panel is hinged along a side thereof extending along the forward part of said instrument panel behind said windshield, said foam well formed by a downward extending contour of said instrument panel substrate adjacent said deployment opening creating a foam layer of greater depth below said overlying covering layer than the depth of said foam layer over said deployment door substrate panel and other regions of said instrument panel substrate.

6. The construction according to claim 5 wherein two deployment door substrate panels are provided in the top of said instrument panel joined together along a line extending parallel to said hinging axis of said one deployment door substrate panel behind said windshield, the other deployment door substrate panel hinged along a side parallel thereto, and another foam well extending rearward of said hinging side of said other deployment door substrate panel, said another foam well comprised of a downwardly extending contour of said instrument panel adjacent said deployment opening forming a space below said overlying covering layer substantially greater depth than average depth of said foam layer overlying said deployment door substrate panels and other regions of said instrument panel.

7. The construction according to claim 6 wherein said foam wells are of a depth of at least four times said average depth of said foam layer over said deployment door substrate panels.

* * * * *